(12) United States Patent
Fabing et al.

(10) Patent No.: US 9,527,350 B2
(45) Date of Patent: Dec. 27, 2016

(54) TIRE FOR DRIVING ON ICE

(75) Inventors: Daniel Fabing, Clermont-Ferrand (FR);
Sébastien Fugier, Saint Bonnet Pres Riom (FR); Matthieu Durat, Clermont-Ferrand (FR); Cyril Guichon, Greer, SC (US); Claude Audebert, Les Martres sur Morge (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1530 days.

(21) Appl. No.: 12/996,296

(22) PCT Filed: May 27, 2009

(86) PCT No.: PCT/EP2009/056485
§ 371 (c)(1),
(2), (4) Date: Mar. 22, 2011

(87) PCT Pub. No.: WO2009/147047
PCT Pub. Date: Dec. 10, 2009

(65) Prior Publication Data
US 2011/0162771 A1 Jul. 7, 2011

Related U.S. Application Data

(60) Provisional application No. 61/190,532, filed on Aug. 29, 2008.

(30) Foreign Application Priority Data

Jun. 3, 2008 (FR) ...................... 08 53665

(51) Int. Cl.
*B60C 11/16* (2006.01)
*B60C 11/03* (2006.01)
*B60C 11/12* (2006.01)

(52) U.S. Cl.
CPC .............. *B60C 11/16* (2013.01); *B60C 11/032* (2013.04); *B60C 11/1281* (2013.04); *B60C 11/1625* (2013.04)

(58) Field of Classification Search
CPC ........................... B60C 11/16; B60C 11/1625
(Continued)

(56) References Cited

U.S. PATENT DOCUMENTS 3,757,841 A * 9/1973 Cantz .............................. 152/210
3,805,866 A * 4/1974 Hohnsel ........................ 152/210
(Continued)

FOREIGN PATENT DOCUMENTS

DE 102 58 812 7/2004
FR 1 403 818 11/1965
(Continued)

OTHER PUBLICATIONS

English machine translation of JP2003-267004, dated Sep. 2003.*
(Continued)

*Primary Examiner* — Michael H Wilson
*Assistant Examiner* — Robert Dye
(74) *Attorney, Agent, or Firm* — Cozen O'Connor

(57) ABSTRACT

A tire (10) for driving on ice, comprising: a tread (20) having a rolling surface configured to come into contact with the ground when the tire is rolling along; at least one stud (30) having a longitudinal axis (A-A), a part of the stud projecting from the rolling surface, the intersection between the stud and the plane tangential to the portion of the rolling surface around the stud forming a contour C, that part of the stud that projects from the rolling surface having a minimum
(Continued)

cross section Sm, Sm corresponding to the smallest cross section of the said part in any plane containing the radial direction that passes through the point of intersection between the longitudinal axis of the stud and the plane tangential to the portion of the rolling surface around the stud; at least one recess (200) in the tread forming, on the rolling surface, a contour G, the recess being associated with the stud in that the minimum distance D between the contours C and G is less than or equal to 1 cm; in which, for each stud, the sum of the volumes Vn of the recesses associated with the stud, expressed in mm$^3$, is greater than or equal to the product of the minimum cross section Sm of that part of the stud that projects from the tread, expressed in mm$^2$, multiplied by a length of 50 mm.

12 Claims, 10 Drawing Sheets

(58) Field of Classification Search
USPC .......................................................... 152/210
See application file for complete search history.

(56) References Cited

U.S. PATENT DOCUMENTS

| | | | | |
|---|---|---|---|---|
| 4,934,424 A | * | 6/1990 | Kojima | .................... 152/209.25 |
| 6,003,575 A | * | 12/1999 | Koyama et al. | .......... 152/209.18 |
| 6,374,886 B1 | * | 4/2002 | Eromaki | ........................ 152/210 |
| 6,533,006 B1 | * | 3/2003 | Siltanen | ..................... 152/209.1 |
| 2004/0231775 A1 | | 11/2004 | Eromaki | |
| 2007/0056666 A1 | * | 3/2007 | Eromaki | ........................ 152/210 |

FOREIGN PATENT DOCUMENTS

| | | | |
|---|---|---|---|
| FR | 2 182 750 | | 12/1973 |
| JP | 59-096005 | * | 6/1984 |
| JP | 62-094402 | * | 4/1987 |
| JP | 4-197809 | * | 7/1992 |
| JP | 63-184508 | * | 7/1998 |
| JP | 2003-154527 | * | 5/2003 |
| JP | 2003-267004 | * | 9/2003 |
| WO | WO 02/070287 | | 9/2002 |

OTHER PUBLICATIONS

English machine translation of JP2003-154527, dated May 2003.*
English translation of JP59-096005, dated Jun. 1984.*
Partial Translation of JP 62-094402, dated Apr. 1987.*
English translation of Ogawa (JP62-094402), dated Apr. 1987.*
English translation of Makino (JP04-197809), dated Jul. 1992.*

* cited by examiner

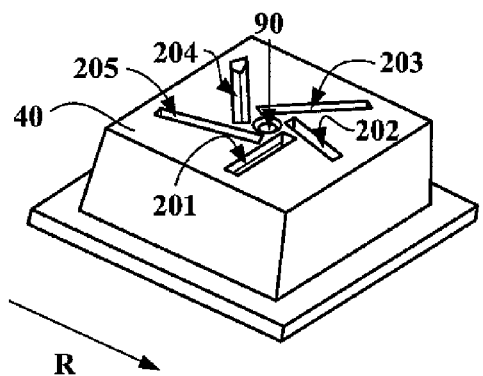 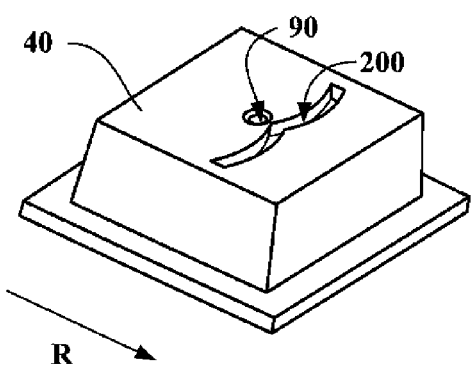
FIG. 21　　　　　　　FIG. 22
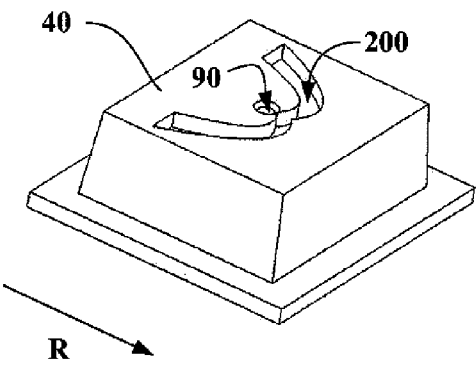 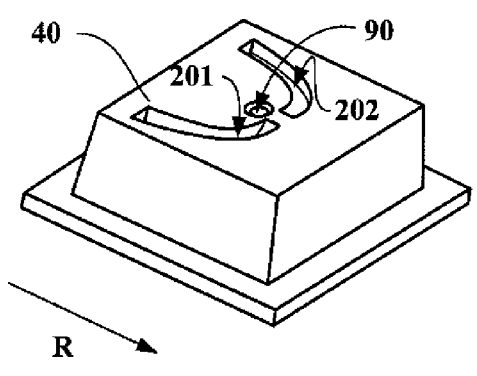
FIG. 23　　　　　　　FIG. 24
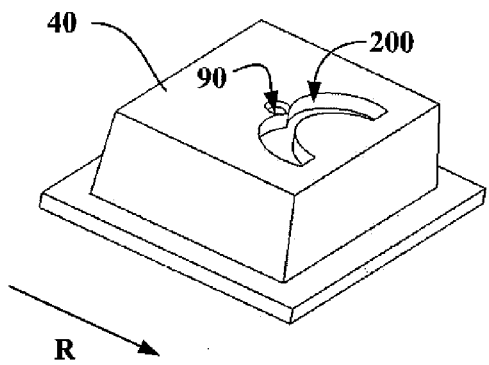 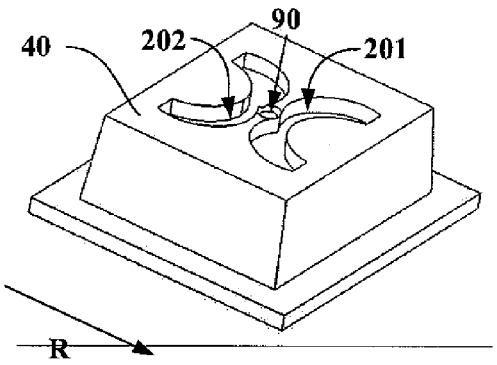
FIG. 25　　　　　　　FIG. 26

SECTION ON B-B

SECTION ON C-C

SECTION ON D-D

SECTION ON C-C

SECTION ON D-D

SECTION ON C-C

SECTION ON D-D

SECTION ON E-E

SECTION ON E-E

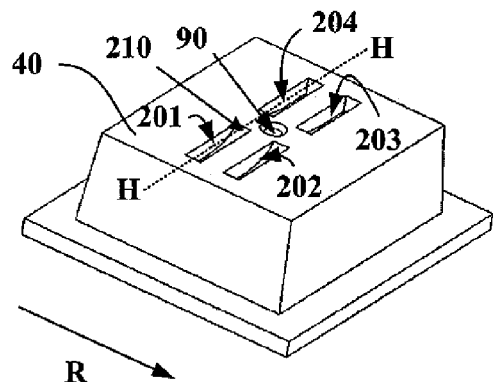
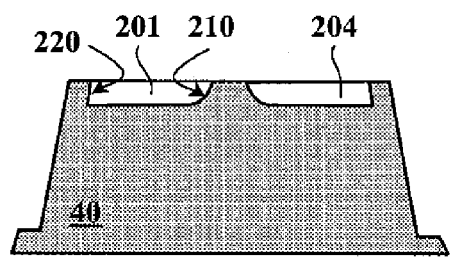
FIG. 42
SECTION ON H-H
FIG. 41
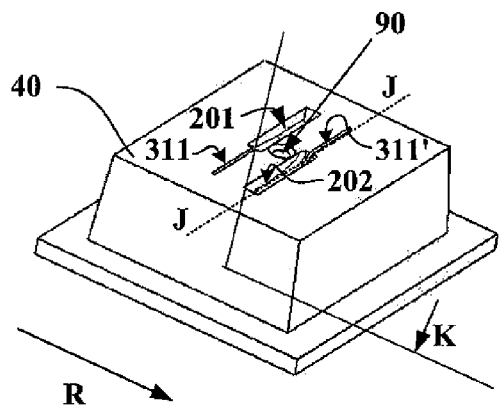
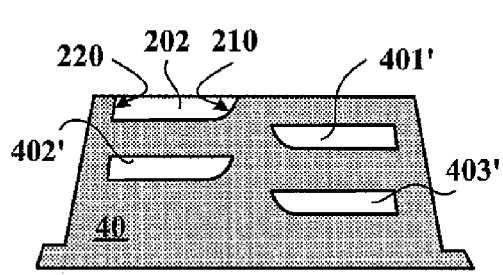
FIG. 44
SECTION ON J-J
FIG. 43
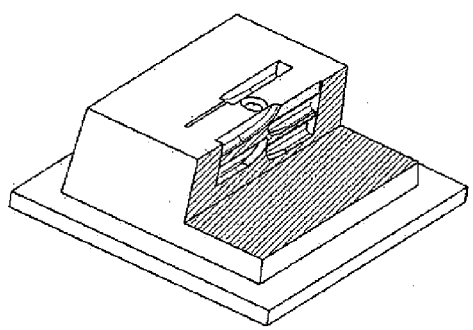
FIG. 45
SECTION ON K-K

TIRE FOR DRIVING ON ICE

This is a U.S. National stage under 35 USC §371 of application no. PCT/EP2009/056485, filed May 27, 2009.

This application claims the priority of French application no. 08/53665 filed Jun. 3, 2008 and U.S. Provisional application Ser. No. 61/190,532 filed Aug. 29, 2008, the entire content of both of which are hereby incorporated by reference.

FIELD OF THE INVENTION

The present invention relates to studded tires for driving on ice.

BACKGROUND OF THE INVENTION

Studded tires have undeniable advantages in terms of how they behave under winter driving conditions, such as driving on icy road surfaces for example. Contact with the ice, and more particularly the fact that the studs dig into the ice, compensates for the loss of grip displayed by the tire tread pattern elements: the studs scrape the ice and generate additional forces on the ice.

One of the difficulties in using studded tires is that the grip reaches its upper limit at values lower than might be expected with studs present.

SUMMARY OF THE INVENTION

The applicants have discovered that this reaching of an upper limit is in part due to the presence of ice splinters which originate when a stud scrapes the ice: if too great a quantity of splinters build up in the area of contact between the tire tread and the ice, the studs have less contact with the ice and lose some of their effectiveness.

One of the objectives of the present invention is to improve the grip of a studded tire for driving on ice.

This objective is achieved by a tire for driving on ice, comprising:

a tread having a rolling surface configured to come into contact with the ground when the tire is rolling along;

at least one stud having a longitudinal axis, a part of the stud projecting from the rolling surface, the intersection between the stud and the plane tangential to the portion of the rolling surface around the stud forming a contour C, that part of the stud that projects from the rolling surface having a minimum cross section Sm, Sm corresponding to the smallest cross section of the said part in any plane containing the radial direction that passes through the point of intersection between the longitudinal axis of the stud and the plane tangential to the portion of the rolling surface around the stud;

at least one recess in the tread forming, on the rolling surface, a contour G, the recess being associated with the stud in that the minimum distance D between the contours C and G is less than or equal to 1 cm.

For each stud, the sum of the volumes Vn of the recesses associated with the stud, expressed in $mm^3$, is greater than or equal to the product of the minimum cross section Sm of that part of the stud that projects from the tread, expressed in $mm^2$, multiplied by a length of 50, and preferably 100 mm.

An embodiment of the invention comprises adding recesses to the tread pattern near the studs, these recesses having a volume large enough to store a significant amount of splinters or lumps of ice generated during scraping. Sm corresponds to the minimum surface area that the stud presents to the ice when the part that projects from the rolling surface is fully embedded in the ice. The volume of the recesses associated with the stud has a significant effect on the grip between the tire and ice when the sum of the volumes of these recesses is at least equal to the product of Sm multiplied by a length of 50 mm. This observation can be understood in the light of the fact that, under braking, the stud can typically scrape the surface of the ice over a length of 20 cm. In theory, it can therefore generate a volume of splinters equal to the product of Sm times 200 mm. It has been found that an appreciable effect is obtained with one quarter of this volume. The storage of ice splinters in the recesses makes it possible to reduce the thickness of the interface between the rolling surface and the surface of the ice. This reduction in the interface thickness also increases the effective protrusion (or depth to which the ice is scraped) and results in a greater force of anchorage in the ice and allows an appreciable improvement in performance in terms of grip on ice.

It should be noted that the recesses are periodically emptied of the splinters contained in the recesses as a result of rotation of the tire. Thus, when the stud is ready to scrape the ice anew, once the tire has made one full revolution, any recess associated with the stud is empty and capable once again of storing up ice splinters.

As a preference, the minimum distance D between the contours C and G is less than or equal to 0.5 cm and, even more preferentially, less than or equal to 0.2 cm.

More preferentially still, the contour G of the recess is in contact with the contour C of the stud. Thus, the splinters generated by the stud are quite naturally stored up in the recess.

According to one advantageous embodiment, the contour G of the recess comprises at least two straight edges positioned facing each other. Therefore, the splinters do not encounter any obstacles as they progress along these edges, thus making the filling of the recess easier.

According to another advantageous embodiment, the contour G of the recess comprises at least two curved edges positioned facing each other. Thus, it is possible to generate transverse edges thereby improving other performance aspects such as, for example, the way in which the tire behaves on snow.

According to one advantageous embodiment, the tire has a preferred direction of rolling and the recess associated with the stud is positioned in such a way that at least part of its contour G comes into contact with the ground before the stud when the tire is rolling in its preferred direction of rolling. This embodiment allows good removal of the splinters generated when the tire is rolling in its preferred direction of rolling. It improves the effectiveness of the stud in terms of drive, through the presence of the recess, while at the same time achieving good behaviour under braking. What happens is that under braking, the stud pivots, or tips over, into a position to minimize the forces acting upon it. In this position, it no longer generates ice splinters (any skidding of modern vehicles being very small on account of electronic assistance systems such as ABS) and the tread block can develop its full grip potential without being impeded by the stud.

This advantage is all the more pronounced when the recess associated with the stud is positioned in such a way that the entire contour G of the recess comes into contact with the ground before the stud when the tire is rolling in its preferred direction of rolling.

According to an alternative embodiment, the tire has a preferred direction of rolling and the recess associated with the stud is positioned in such a way that the entire contour G of the recess comes into contact with the ground after the stud when the tire is rolling in its preferred direction of rolling. This embodiment provides better braking when there is a great deal of skidding, that is to say on a vehicle that has no electronic assistance system of the ABS type. The improvements in drive are not, however, very great.

As a preference, the tread of the tire comprises a plurality of tread blocks, each tread block comprising at least one stud and a plurality of recesses associated with the stud. Thus, the effect obtained by one recess can be amplified and obtained over a full revolution of the wheel. This embodiment also makes it possible to lessen the impact that the recesses have on stud retention.

It is then preferable to provide for each tread block to comprise at least two recesses each having a direction of greatest length on the rolling surface, the directions of greatest length on the rolling surface of at least two of these recesses not being parallel (that is to say being inclined with respect to one another). This embodiment improves the effectiveness of the recesses under stresses of different kinds. For example, if one of the recesses has a transverse direction of greatest length it will be highly effective under transverse stress (when driving round a bend or on a banked road), and a second recess has a direction of greatest length that is inclined with respect to the transverse direction and therefore displays a certain effectiveness under circumferential stress, giving the tire good transverse and circumferential grip.

According to one advantageous embodiment, the recess is extended radially inwards by a sipe. Thus, when wear has worn away the recess in the tread block 40, there remains a sipe which performs its function known per se. Thus the recesses can be made to last a little longer with respect to tread wear.

According to an advantageous variant, the sipe is extended radially inwards by a cavity, the cavity being dimensioned such that when the tread is worn and the cavity opens onto the rolling surface, the cavity forms a recess in the rolling surface. This allows the effect obtained by the tire according to the invention to last even longer. It is therefore possible to make the recesses last longer and maintain their effectiveness with respect to tread wear.

BRIEF DESCRIPTION OF THE DRAWINGS

FIGS. 9 to 45 depict tread blocks of tires according to the invention.

DETAILED DESCRIPTION OF THE DRAWINGS

Figure 1:
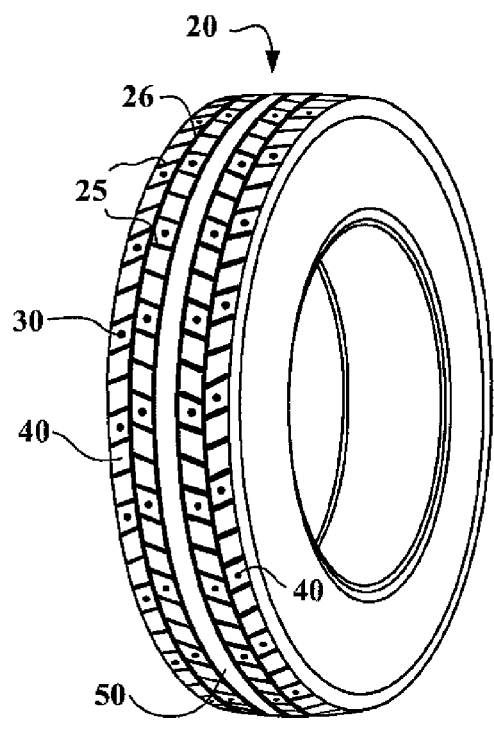
FIG. 1 depicts a studded tire according to the prior art.

The term "tire" here denotes any type of elastic tire whether or not in service it is subjected to an internal inflation pressure.

The term "groove" designates a cut-out in the tire tread that opens onto the rolling surface and the function of which is to evacuate water that has accumulated between the tire and the surface on which the tire rolls. Grooves may be circumferential or transverse. Typically, in a passenger car tire, they have a width of between 2 and 10 mm and a depth of about 8 mm. Grooves are distinguished from sipes in that sipes are much narrower (typically 0.3 to 1.5 mm) than grooves.

The term "stud" as used in this document is synonymous with the term "spike" also used in the prior art.

The term "recess" here denotes a hollow made in the rolling surface, the mean radial depth of which is greater than or equal to 1 mm.

The term "cavity" here denotes a cavity in the tread which does not directly open onto the rolling surface (when the tire is new). A "cavity" may open onto the rolling surface via a sipe.

The "longitudinal axis" of a stud corresponds to the axis of symmetry of the stud in the direction of its longest dimension that passes through the surface of the stud configured to come into contact with the ground when the stud is fitted to a tire and the tire is rolling along the ground, if the stud has such an axis of symmetry. In a stud with no such axis of symmetry, the "longitudinal axis" denotes the direction of the longest dimension of the stud that passes through the surface of the stud configured to come into contact with the ground when the stud is fitted to a tire and the tire is rolling along the ground.

The "head" of a stud here means that end of the stud which anchors the stud in the tread of a tire. The head has a mean diameter greater than the mean diameter of the body of the stud, these diameters being measured in a direction at right angles to the longitudinal axis of the stud. The transition between the body of the stud and the head is usually via a part whose diameter is smaller than the diameters of the head and of the body.

The "rolling surface" here means all of those points of the tread that come into contact with the ground when the tire is rolling along without the studs being inserted into the tread.

The expression "rubber mix" denotes a rubber composition containing at least one elastomer and one filler.

The expression "tread block" denotes a part of the tread made of vulcanized rubber mix and delimited by grooves.

When it is said that a part of a stud "projects" from the rolling surface, this should be understood as meaning that this part protrudes from the rolling surface at least when there is no contact with the ground.

The "portion of the rolling surface around the stud" here means a portion of the rolling surface in proximity to the stud. If the stud projects from a tread block, then it is taken to mean that portion of the rolling surface that corresponds to this tread block, otherwise, it is taken to mean a portion of the rolling surface that surrounds the stud up to a distance of 1 cm from the contour C of the stud.

A recess is said to be "associated with" a stud if the minimum distance D between:
the contour C of the stud (formed by the intersection between the stud and the plane tangential to the portion of the rolling surface around the stud), and
the contour G of the recess on the rolling surface,
is less than or equal to 1 cm.

If the contour G of the recess is close enough to the contour C of several studs, then it is associated with all these studs. However, it is preferable for each recess to be associated with just one stud.

The "minimum distance between the contour C of a stud and the contour G of a recess associated with it" means the minimum distance between a point on the contour C of the stud and a point on the contour G of the recess. This distance is generally non-zero except where the contour C and the contour G touch at one or more points, in which case that distance is zero.

A "radial" direction here is a direction corresponding to a radius of the tire. A radial direction is therefore a direction at right angles to the axis of rotation of the tire. It is in this sense that a point P1 is said to be "radially inside" a point P2 (or "radially on the inside of" the point P2) if it is closer to the axis of rotation of the tire than is point P2. Conversely, a point P3 is said to be "radially outside" a point P4 (or "radially on the outside of" the point P4) if it is further away from the axis of rotation of the tire than is point P4. Progress will be said to be "radially inwards (or outwards)" when it is in the direction of smaller (or larger) radii. When radial distances or depths are being discussed, it is this sense of the word that also applies.

A "transverse" direction is a direction parallel to the axis of rotation of the tire.

A direction which is both normal to a radial direction and normal to the transverse direction is denoted a "circumferential" direction.

The term "sipe" here denotes a very narrow incision, typically between 0.3 and 1.5 mm wide, as compared with a groove whose width generally exceeds 2 mm.

The "preferred direction of rolling" of a tire means the direction of rolling recommended by the tire manufacturer, often indicated on the sidewall of the tire by means of an arrow. When fitting the tire to a vehicle, the tire should be fitted in such a way that the preferred direction of rolling of the tire corresponds to the direction in which the tire will roll as the vehicle travels forward.

FIG. 1 schematically depicts a tire 10 according to the prior art, comprising a tread 20 having a rolling surface configured to come into contact with the ground when the tire is rolling along. The tread 20 comprises a plurality of transverse 25 and circumferential 26 grooves and a plurality of studs 30. The studs 30 are positioned across the entire width of the rolling surface in tread blocks 40 of the tread 20. The central bar 50 of the tread may also have studs 30. The studs 30 are arranged in several positions around the periphery of the tire so that studs are at all times in contact with the ground on which the tire is rolling.

Figure 2:
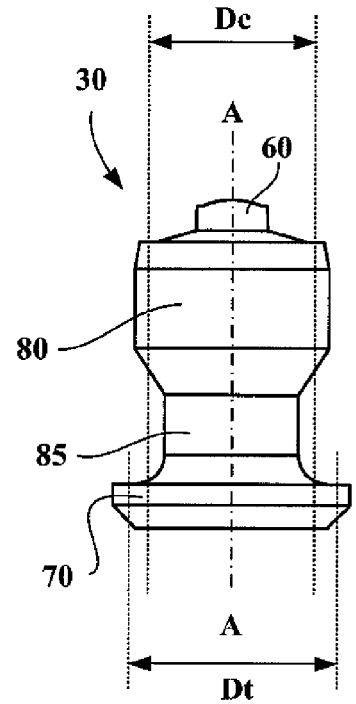
FIG. 2 depicts a stud according to the prior art.

FIG. 2 schematically depicts a stud 30 according to the prior art. The stud 30 has a longitudinal axis A-A. The profile of the stud 30 is generally cylindrical and centered on the axis A-A. The stud 30 has two axial ends: one of the axial ends defines a first part, here embodied by an "insert" 60, configured to come into contact with the ground (the ice, the snow or the bare surface) when the stud 30 is fitted to the tire 10 and the tire 10 is rolling along the ground. The insert may advantageously be made of a material that is different from the material of the rest of the stud. This means that this part, which is subject to very high mechanical stresses, can be made of a harder material. This also makes it possible, in the case of certain embodiments, to produce a molded or injection-molded body to which an insert is attached. Of course, use may also be made of studs formed all in one material. In other words, the first part 60 is not necessarily an insert, i.e. a piece that is separate from the rest of the stud and inserted into it. It can be integral with the stud in the sense that the first part 60 is made of the same material as the rest of stud 30 and is manufactured together with it as one piece.

The other end of the stud 30 is formed by a head 70 which is configured to anchor the stud 30 into the tread 20 of the tire 10.

A body 80 connects the first part 60 and the head 70 of the stud 30. The mean diameter Dc of the body is smaller than the mean diameter Dt of the head 70 of the stud 30, these diameters being measured at right angles to the axis of the stud. The body 80 is separated from the head 70 by a part 85 whose diameter is smaller than the diameters of the head and of the body.

Figure 3:
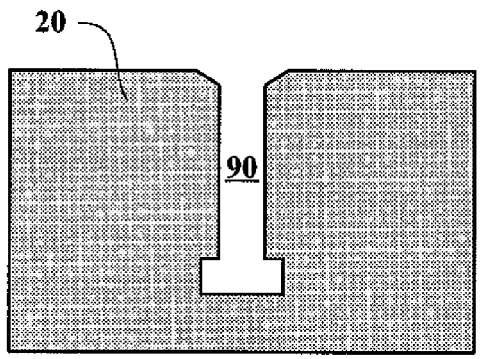
FIG. 3 depicts a stud hole according to the prior art.

FIG. 3 schematically depicts a part of the tread 20 of the tire 10. This tread has a stud hole 90. Each stud hole comprises a cylindrical portion open to the outside of the tread 20 of the tire 10 and is designed to collaborate with a stud 30.

Figure 4:
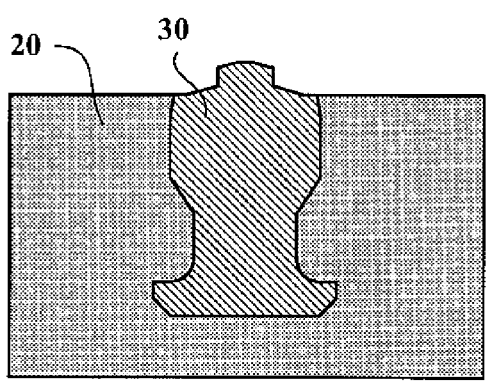
FIG. 4 depicts a stud inserted in a stud hole, according to the prior art.

FIG. 4 schematically depicts the same part of the tread 20 when the stud 30 has been inserted. Thanks to the elasticity of the rubber mix of which the tread is made, the tread 20 perfectly envelops the stud 30 and firmly anchors it into the tire.

Figure 5:
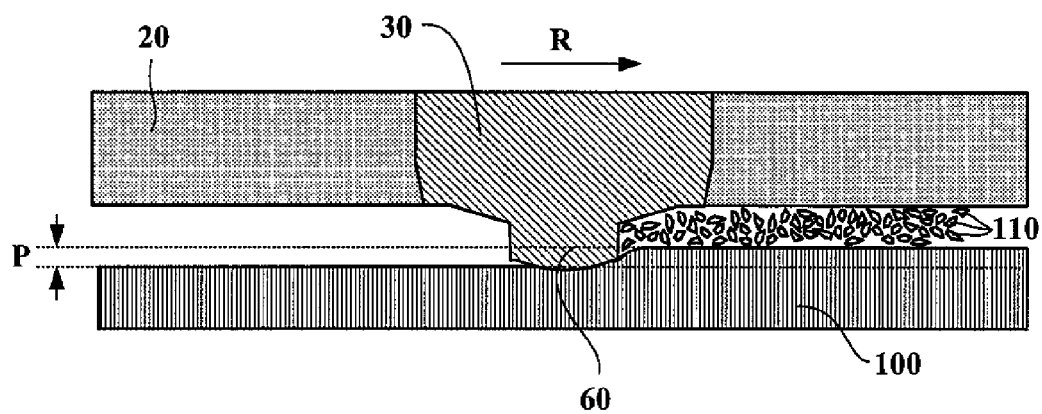
FIG. 5 illustrates how a studded tire according to the prior art works.

FIG. 5 illustrates the way in which a studded tire according to the prior art works. It depicts a part of the stud 30 and of the tread 20 made of rubber mix surrounding this part of the stud. The stud is depicted at the instant that it comes into contact with the ice 100. The direction of rotation R of the tire is indicated with an arrow R. The first part 60 of the stud 30 digs into the ice 100 to a mean depth P. By digging into the ice 100 and scraping it, the stud 30 locally breaks the ice and generates a great many ice splinters 110 which build up at the interface between the tread 20 and the ice 100 and ultimately prevent the first part 60 of the stud 30 from digging any deeper into the ice 100, and this has a negative effect on tire grip.

Figure 6:
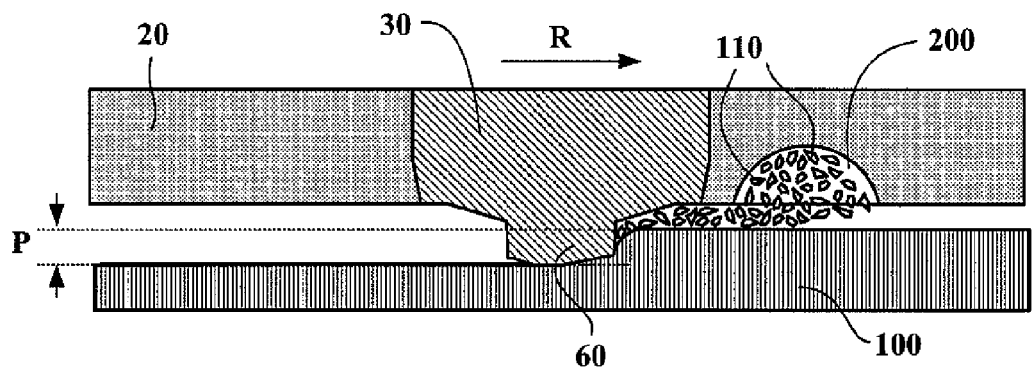
FIG. 6 illustrates how a studded tire according to the invention works.

FIG. 6 illustrates the way in which a studded tire according to the invention works and which is able to reduce this negative effect. Specifically, this tire comprises a recess 200 in which the splinters 110 formed as the stud 30 digs into the ice 100 are stored. The splinters 110 do not therefore build up between the rolling surface of the tread 20 and the ice 100. Thus, the stud 30 can dig deeper into the ice 100 resulting in a greater mean depth of penetration P and greater grip of the tire on the ice.

Figure 7:
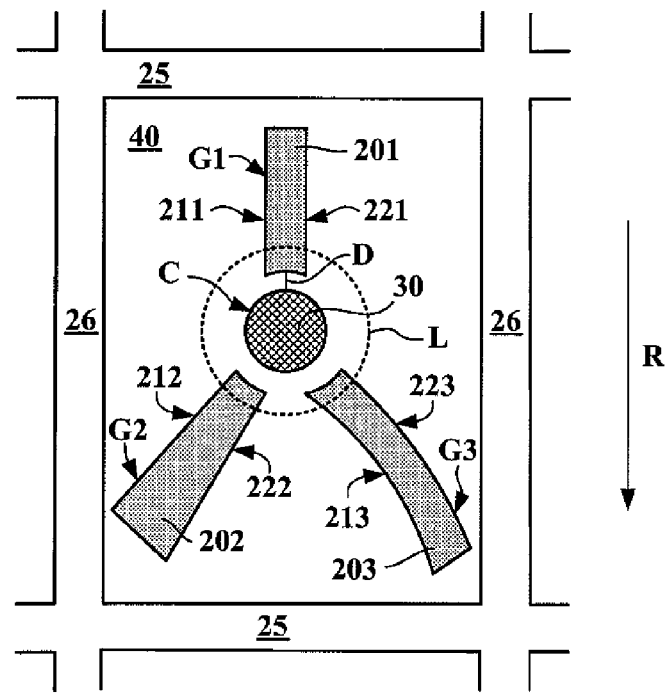
FIGS. 7 and 8 illustrate a number of geometric parameters of a tire according to the invention.
Figure 8:
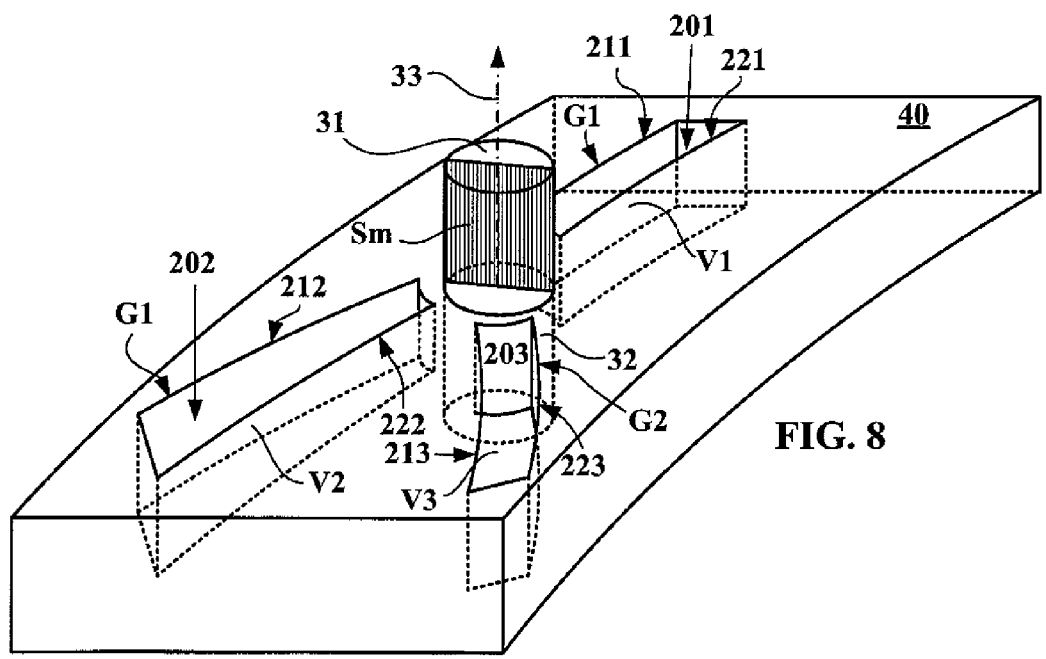

FIGS. 7 and 8 illustrate a number of geometric parameters of a tire according to the invention. These figures schematically depict a tread block 40 of the tire tread 20, viewed from a position radially on the outside of the tread (FIG. 7) and viewed in perspective (FIG. 8). As suggested by FIG. 7, this tread block 40 is surrounded by a plurality of other blocks and is separated from these blocks by transverse grooves 25 and circumferential grooves 26. It should be noted, however, that the presence of grooves is not an essential feature of a tire according to the invention. Nevertheless, in what follows, the invention is illustrated with the help of tread blocks 40 surrounded by grooves, because most tires for driving on ice comprise such tread blocks.

The tread block 40 comprises a stud 30 having a longitudinal axis 33 (see FIG. 8), a part 31 of the stud (see FIG. 8) projecting from that portion of the rolling surface that the surface of the tread block 40 forms. The stud is extended towards the inside of the tread by a part 32 (see FIG. 8), just a portion of which is suggested by the dotted line. The intersection between the stud 30 and the plane tangential to the portion of the rolling surface around the stud forms a contour C. In the case of the stud depicted, this contour C is a circle.

As shown by FIG. 8, that part 31 of the stud that projects from the rolling surface has a minimum cross section Sm, Sm corresponding to the smallest cross section of the part 31 in any plane containing the radial direction that passes through the point of intersection between the longitudinal axis 33 of the stud and the plane tangential to the portion of the rolling surface around the stud. Because the stud is directed radially in the tread, the radial direction that passes through the point of intersection between the longitudinal axis of the stud and the plane tangential to the portion of the rolling surface around the stud coincides with the direction of the longitudinal axis of the stud, and the cross section of the part 31 is the same in all planes containing the radial direction that passes through the point of intersection between the longitudinal axis 33 of the stud and the plane tangential to the portion of the rolling surface around the stud. Sm provides a measure of the smallest possible surface that part 31 of the stud presents to the ice, regardless of the direction of relative movement of the tire with respect to the ice (e.g. during acceleration, braking or uncontrolled sliding). The cross sections are the same if the part 31 is cylindrical. However, this is not so if its shape, for example, is rectangular.

The tread block 40 further comprises three recesses 201 to 203 associated with the stud 30 and each forming, on the rolling surface of the tire, a closed contour G1-G3. The recesses 201 and 202 have two straight edges 211-212 and 221-222 positioned facing each other. By contrast, the recess 203 comprises two curved edges 213 and 223 positioned facing each other. In this particular instance, the recesses do not touch the contour C but end a certain distance D (marked in the case of the recess 201) away from the contour C. The distance D is less than 1 cm. The limit of 1 cm is depicted in FIG. 7 by the circle L (dotted line).

The recesses 201 to 203 have volumes V1, V2, V3. The sum of the volumes V1+V2+V3, expressed in mm$^3$, is greater than or equal to the product of the minimum cross section Sm of that part of the stud that projects from the tread, expressed in mm$^2$, multiplied by a length of 50 mm. In this particular instance, Sm=4 mm$^2$, V1=70 mm$^3$, V2=70 mm$^3$, V3=70 mm$^3$.

It should noted that the recess 202 differs from the recesses 201 and 203 in that the cross section of the recess, measured at right angles to one of the edges 212 or 222, is not constant over its entire length but has its minimum near the contour C and increases in the direction away from the stud 30. This increase here is obtained by an increase both in the width of the recess, measured at right angles to one of the edges 212 or 222, and in the radial depth of the recess.

FIGS. 9 to 45 depict tread blocks of tires according to the invention. For the sake of clarity, the studs have not been depicted; only the recesses 200 and the stud holes 90 designed to receive a stud have been depicted. The direction of rotation of the tire is sometimes indicated using an arrow R.

Figure 9:
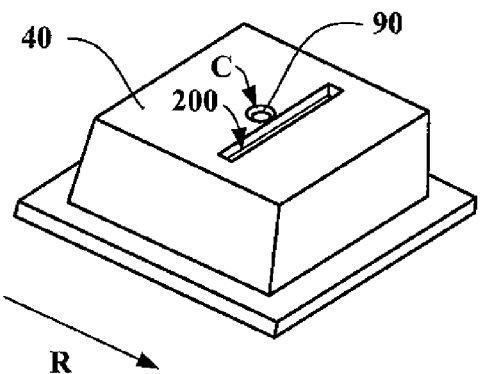

FIG. 9 depicts a very simple variant with a recess of square cross section (2×2 mm$^2$) positioned transversely. As indicated by the arrow R, this recess is positioned in such a way that it comes into contact with the ground before the stud inserted in the stud hole. This arrangement allows for clean starts on icy ground.

Figure 10:
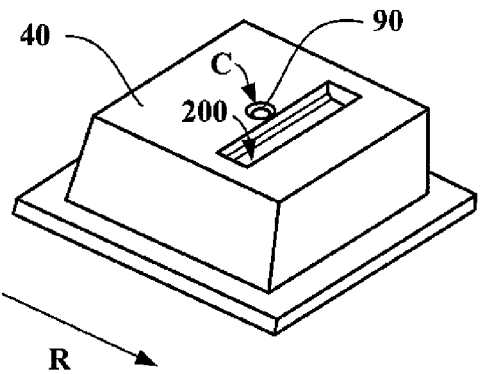
Figure 11:
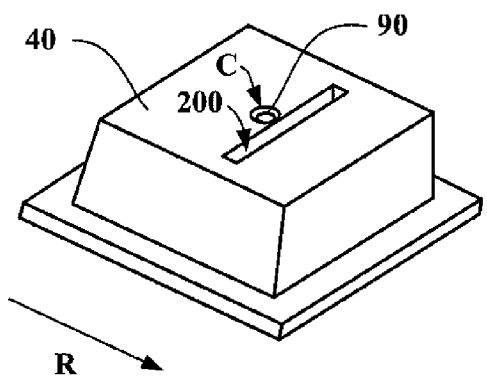

FIGS. 10 and 11 depict similar variants with wider (cross section: 4×2 mm$^2$) or deeper (cross section: 2×4 mm$^2$) recesses.

Figure 12:
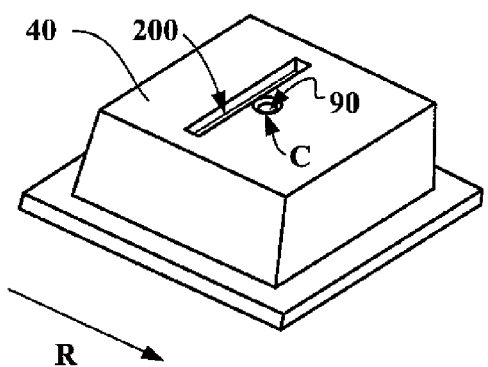

FIG. 12 depicts a variant very similar to that of FIG. 9 but in which the recess associated with the stud is positioned in such a way that the entire contour G of the recess comes into contact with the ground after the stud when the tire is rolling in the direction of rolling indicated by the arrow R. This arrangement improves the grip of the tire on ice under braking.

Figure 13:
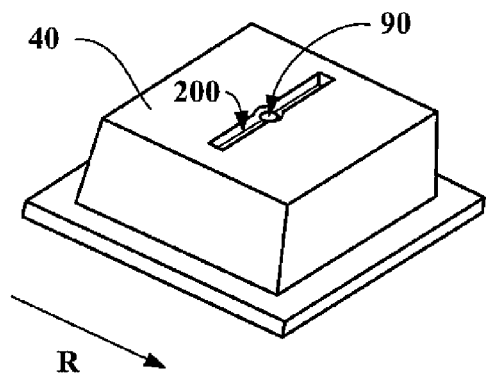

FIG. 13 depicts an advantageous compromise between the tread block 40 of FIG. 9 (advantageous when a driving torque is applied to the tire) and that of FIG. 12 (advantageous when a braking torque is applied to the tire): the recess 200 is positioned in such a way that its edges come into contact with the ground at practically the same time as the stud inserted in the stud hole, thus allowing good removal of ice splinters both on acceleration and under braking.

In the variants of FIGS. 9 to 13, the recess is in contact with the contour C of the stud. This feature has the advantage of making quick removal of ice splinters generated in close proximity to the stud easier but has the disadvantage of slightly reducing the anchorage of the stud in the tread. If the risk of studs being pulled out is to be reduced as far as possible then it is advantageous to offset the recess or recesses from the contour of the stud. Of course, care has to be taken to ensure that the recess or recesses is or are not too far removed from the contour C of the stud because that would significantly reduce the effectiveness with which the splinters are removed and therefore the grip of the tire on ice. It has been found that good removal can be achieved with distances of up to 1 cm.

Figure 14:
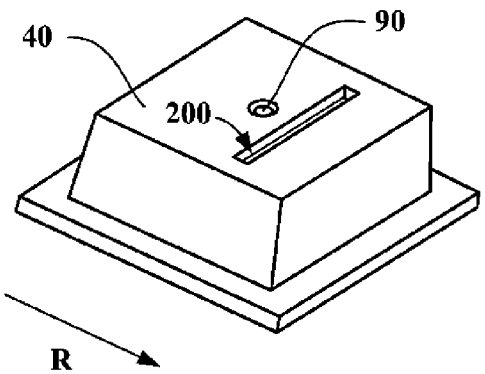

FIG. 14 depicts a variant of a tread block 40 of a tire according to the invention, in which the recess 200 is positioned in such a way that the edge of the recess 200 closest to the stud hole 90 is at a non-zero minimum distance from the contour of the stud hole (and therefore from the contour of the stud). As already stated above, this variant has the advantage of allowing excellent stud anchorage.

Figure 15:
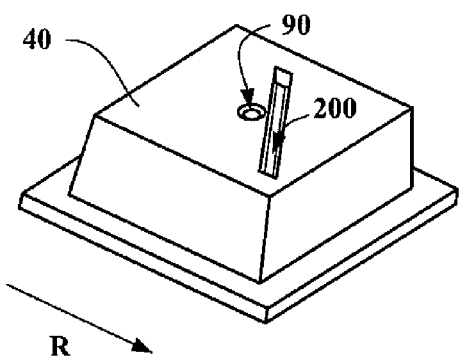
Figure 16:
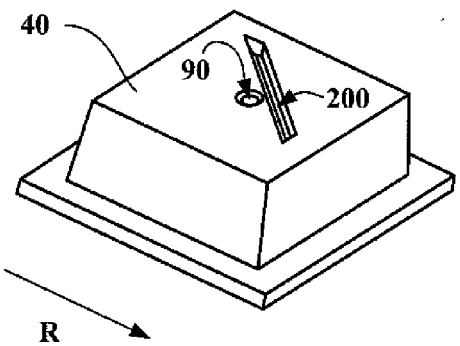
Figure 17:
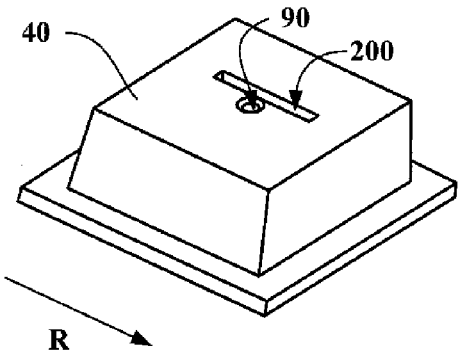

FIGS. 9 to 14 depict tread blocks 40 having a transverse straight-edged recess 200. It is possible to provide one or more substantially straight-edged recesses whose direction of alignment is inclined with respect to the transverse direction. Corresponding variants are depicted in FIGS. 15 to 17. The advantage of arranging the recess in this way is that transverse grip of the tire on ice (for a rolling direction corresponding to the arrow R) is improved.

FIG. 17 depicts an extreme variant in which a straight-edged recess 200 is circumferentially aligned.

Although FIGS. 15 to 17 all show recesses 200 in contact with the contour C of the stud hole (and therefore of the stud), it is possible to combine the inclining of the recess with the offsetting of the recess or recesses 200 from the contour of the stud.

Figure 18:
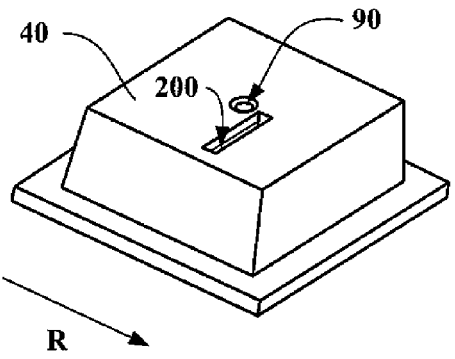

The recess 200 does not necessarily extend from a stud towards two opposed grooves as in the case of the recesses depicted in FIGS. 9 to 17. FIG. 18 depicts a variant in which the recess 200 extends from the contour of the stud hole 90 (and therefore of the stud) towards just one groove delimiting the tread block 40. This variant has the advantage that the amount of rubber mix enveloping the stud is greater, allowing the stud to be firmly anchored.

Figure 19:
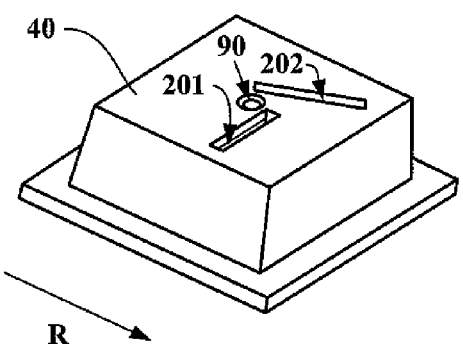
Figure 20:
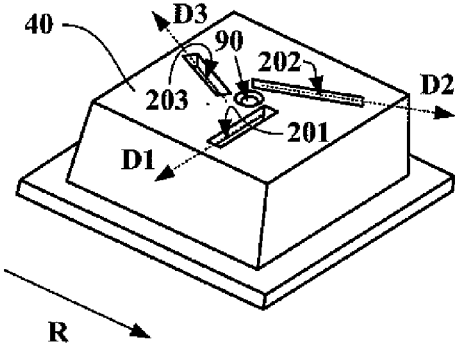

FIGS. 19 to 21 depict variants in which a greater number of recesses is provided: two recesses 201 and 202 (FIG. 19), three recesses 201 to 203 (FIG. 20) or even five recesses 201-205 (FIG. 21). Each of these variants comprises several recesses each having a direction of greatest length on the rolling surface, the directions of greatest length on the rolling surface of these recesses not being parallel. These directions of greatest length D1 to D3 are indicated in respect of the variant depicted in FIG. 20. The variants of FIGS. 20 and 21 differ in that the grip of the tire is excellent in all directions. The direction of rolling R has not been marked in FIGS. 19 to 21 because, on account of their multi-directional geometry, these tread blocks 40 can be positioned on the tread in a great many ways.

The variants depicted in FIGS. 7 to 21 all comprise straight-edged recesses. This does not mean, however, that this is an essential feature of the invention: it is entirely possible, and may be advantageous, to have recesses with curved edges. Such variants are depicted in FIGS. 22 to 25.

FIG. 22 depicts a variant similar to that of FIG. 9, in which the straight edges have been replaced by doubly curved edges.

FIG. 23 depicts another variant whereby this curvature is far more pronounced. This variant allows good grip in both circumferential and transverse directions.

FIG. 24 depicts a variant similar to that of FIG. 23, in which the single recess has been replaced by two recesses 201 and 202 that have curved edges. This variant has the advantage of providing better anchorage for the stud.

FIGS. 25 and 26 depict other variants comprising recesses that have curved edges.

Figure 27:
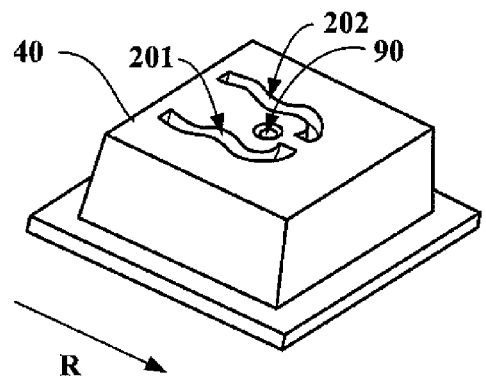

FIG. 27 depicts another variant with two recesses 201 and 202 that have curved edges. Those skilled in the art will understand that it is possible to adapt the compromise between transverse and circumferential grip by suitably altering the specific geometry of the recess (or of the recesses if there is more than one of these).

The variants of tread block 40 depicted in FIGS. 9 to 27 all have recesses with two edges which face each other. This is not an essential feature of the invention. It is entirely possible to have recesses of circular, oval, ellipsoidal, polygonal or some other contour.

Figure 28:
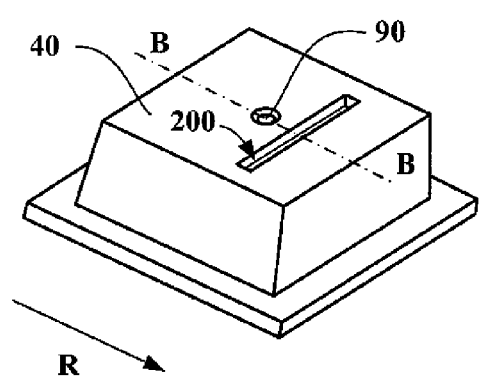
Figure 30:
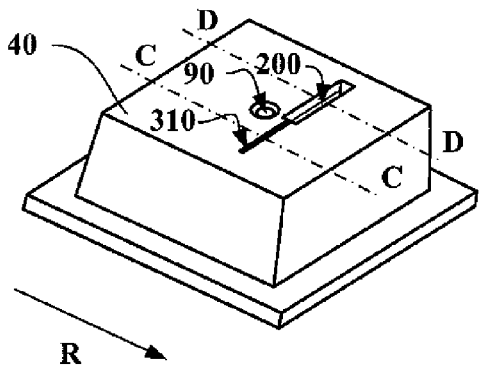
Figure 29:
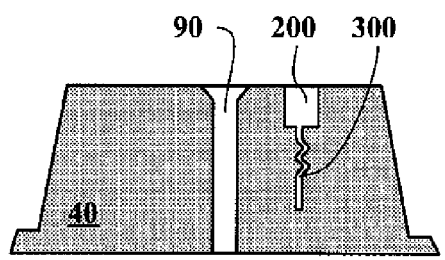
Figure 31:
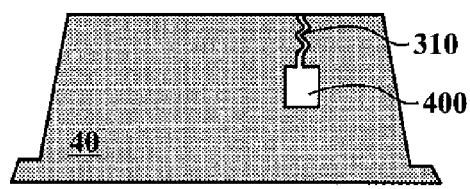
Figure 32:
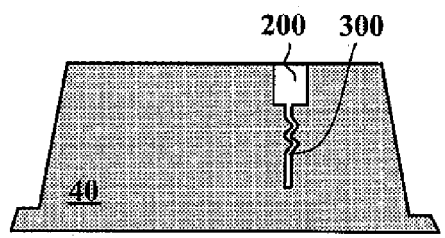

It may be advantageous to combine all these recesses with a sipe 300 which extends the recess radially inwards, as depicted in FIGS. 28 and 29. Thus, when wear has worn away the recess in the tread block 40, there remains a sipe which performs its function known per se.

It is also possible to provide recesses which appear only gradually as the tire becomes worn. This is the case in the variant depicted in FIGS. 30 to 32. The tread block 40 depicted comprises, at the rolling surface, when new (that is to say prior to any wear caused by rolling along), a recess 200 which extends from the stud hole 90 towards one of the grooves delimiting the tread block 40. This recess is extended by a sipe 310 which extends in the opposite direction. This sipe 310 is extended radially inwards by a cavity 400. This cavity is formed in such a way that when the recess 200 disappears as a result of tread wear, this cavity 400 opens onto the rolling surface and in turn forms a recess that will allow ice splinters to be removed. The cavity may be molded using molding equipment known to those skilled in the art and described, for example, in document U.S. Pat. No. 5,964,118.

Figure 33:
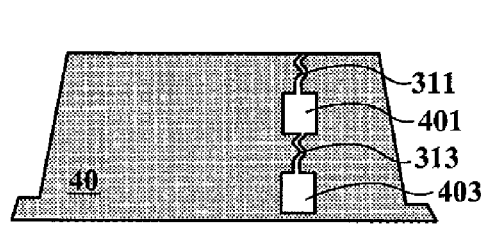
Figure 34:
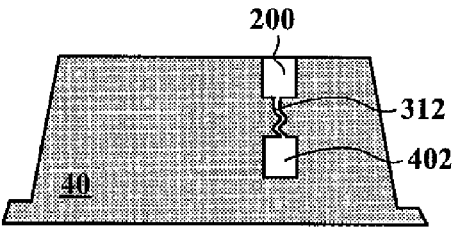

FIGS. 33 and 34 depict in cross section a more complex variant, employing the same principle. The tread block 40 which, seen from the outside of the tire, is identical to that in FIG. 30, comprises, at the rolling surface, when new (that is to say before any wear due to rolling along), a recess 200 which extends from the stud hole 90 towards one of the grooves delimiting the tread block 40. This recess is extended by a sipe 311. This sipe 311 is extended radially inwards by two cavities 401 and 403 separated by a sipe 313. The recess itself is extended radially inwards by a sipe 312 which opens onto a cavity 402. The sipes 311-312 and the cavities 401-403 are dimensioned such that when the recess 200 disappears through tread wear, the cavity 401 opens onto the rolling surface and in turn forms a recess allowing ice splinters to be removed. As wear progresses, the cavity 402 takes over and finally the cavity 403 forms a recess when the recess formed by the cavity 402 has disappeared.

Figure 37:
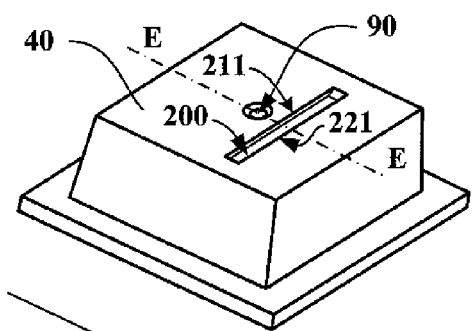
Figure 38:
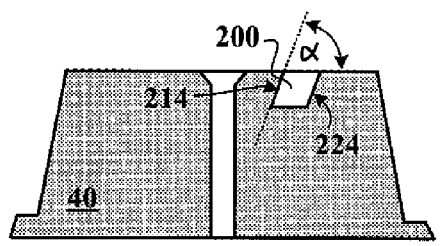

The recesses in the variants depicted in the figures are all of substantially rectangular cross section, but this is not an essential feature of the invention. It is possible to imagine rounded or even hemispherical cross sections. According to another variant, the recesses may have a triangular or parallelepipedal cross section. FIGS. 37 and 38 show a recess 200 of parallelepipedal cross section. The walls 214 and 224 of the recess 200 which extend the edges 211 and 221 of the recess 200 radially inwards are inclined by an angle $\alpha$ (alpha) with respect to the rolling surface of the tread block 40 (in this instance, $\alpha=110°$). Thus, the recess 200 "scrapes" the ice, encouraging the removal of ice splinters. Of course, it is possible to conceive of inclining just one of the walls 214 or 224. In this document, any angle relating to a particular direction of a recess corresponds to the smallest angle between the rolling surface and this direction.

Figure 35:
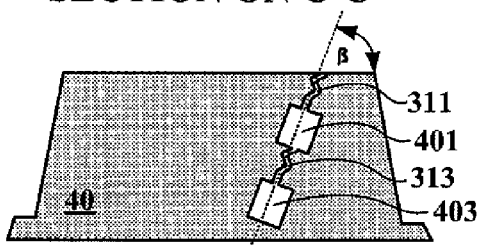
Figure 36:
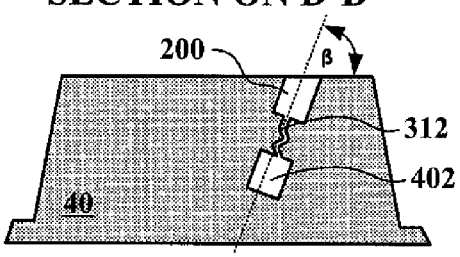

The principle of inclining the recesses may also be applied to "renewable" recesses like those depicted in FIGS. 30 to 34. FIGS. 35 and 36, which should be compared with FIGS. 33 and 34, illustrate this option. The sipes 311-313 are inclined by an angle $\beta$ (beta) with respect to the rolling surface (in this instance, $\beta=100°$).

Figure 39:
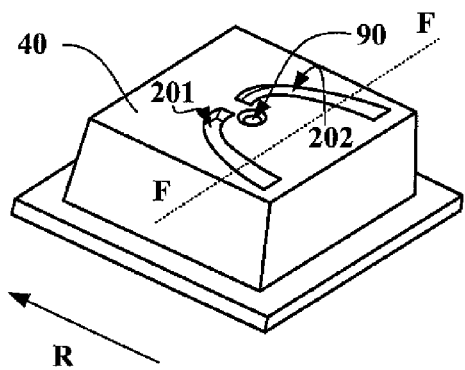
Figure 40:
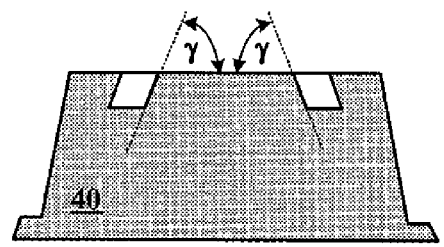

FIGS. 39 and 40 depict another complex variant. The tread block 40 comprises two recesses 201 and 202 with curved edges, the cross sections of which are parallelepipedal, with an angle of inclination $\gamma$ with respect to the rolling surface.

FIGS. 41 and 42 depict another variant of a tread block 40 of a tire according to the invention. This tread block comprises four recesses 201-204 each having a rectangular contour on the rolling surface. The figures clearly illustrate one advantageous geometry of the "internal" end of the recess (that is to say of the end closest to the stud hole and therefore to the stud, as opposed to the "exterior" end of the recess). The "internal" end of the recess 201 is labelled with the reference 210, the "exterior" end with the reference 220. At the "internal" end 210, the depth of the recess increases continuously, in the manner of a children's slide with a flat bottom. This geometry is particularly advantageous because it allows good removal of ice splinters while at the same time allowing good stud anchorage.

FIGS. 43 to 45 illustrate the internal geometry of another variant of tread block 40 according to the invention. FIG. 44 depicts the cross section of the tread block 40 in a section on J-J (see FIG. 43). FIG. 45 depicts the cross section of the tread block 40 in a section on K-K (see FIG. 43). The tread block depicted has two sets of recesses, sipes and cavities. The first set comprises a recess 201 which extends from the stud hole 90 towards one of the grooves delimiting the tread block 40. This recess is extended by a sipe 311. This sipe 311 is extended radially inwards by two cavities separated by a sipe (not visible in the figure). The recess 201 itself is extended radially inwards by a sipe which opens onto a passage (not visible in the figure). The second set is identical to the first after rotation by 180° about a radial direction passing through the axis of the stud hole 90. It comprises a recess 202 which extends from the stud hole 90 towards one of the grooves delimiting the tread block 40. This recess is extended by a sipe 311'. This sipe 311' is extended radially inwards by two cavities 401' and 403' (FIG. 44) separated by a sipe (not visible). The recess 202 itself is extended radially inwards by a sipe (not visible) which opens onto a cavity 402' (FIG. 44). This variant of tread block 40 makes it possible for grip to be the same under braking torque as it is under driving torque, while at the same time retaining a very good life in terms of wear.

The figures clearly illustrate another advantageous geometry of the "internal" end 210 of the recess. At this "internal" end 210, the depth of the recess increases continuously, in the manner of a slide with a rounded bottom. This geometry is also very effective in removing ice splinters while at the same time allowing even better stud anchorage.

Figure 46:
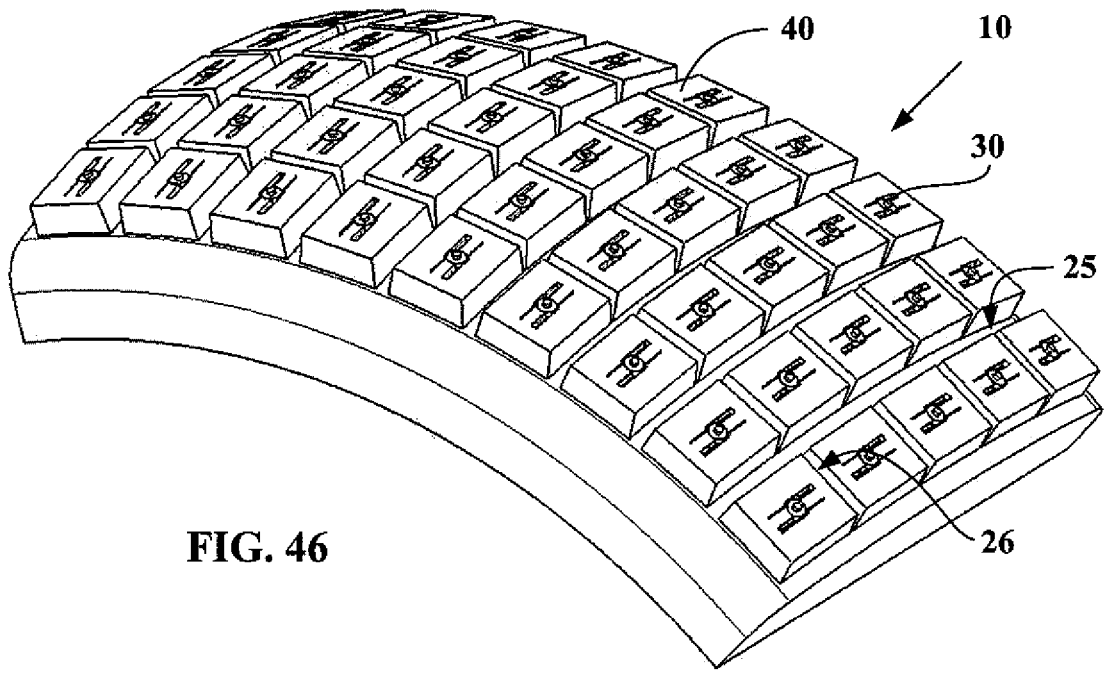
FIG. 46 depicts a portion of a tire according to the invention, after the studs are fitted.

FIG. 46 depicts a tire 10 according to the invention, the tread of which comprises a plurality of tread blocks 40 identical to the tread block depicted in FIG. 43, which are separated by transverse 25 and circumferential 26 grooves.

Acceleration tests have demonstrated the improvement in grip of the tires according to the invention. A tire like that of FIG. 46, of the 205/55 R16 size, was compared against a conventional "X-ice North" Michelintire. The tire according to the invention yielded a significant improvement in acceleration times on ice, in spite of the fact that the tire according to the invention had 6% less groove ratio which in theory should have led to an approximately 7% drop in grip on ice.

The invention claimed is:

1. A tire for driving on ice, comprising:
    a tread having a rolling surface configured to come into contact with the ground when the tire is rolling along;
    at least one substantially cylindrical stud having a longitudinal axis, a part of the stud projecting from a tread block on the rolling surface, the intersection between the stud and the plane tangential to the portion of the rolling surface around the stud forming a contour C, that part of the stud that projects from the rolling surface having a minimum cross section Sm, Sm corresponding to the smallest cross section of the said part in any plane containing the radial direction that passes through the point of intersection between the longitudinal axis of the stud and the plane tangential to the portion of the rolling surface around the stud; and
    at least two recesses in the tread block, each recess forming, on the rolling surface, a closed contour G, the recesses being associated with the stud in that the minimum distance D between the contours C and G is less than or equal to 1 cm;
    wherein, for each stud, the sum of the volumes Vn of the recesses associated with the stud, expressed in $mm^3$, is greater than or equal to the product of the minimum cross section Sm of that part of the stud that projects from the tread, expressed in $mm^2$, multiplied by a length of 50 mm.

2. The tire of claim 1, wherein the minimum distance D between the contours C and G is less than or equal to 0.5 cm.

3. The tire of claim 1, wherein the contour G of at least one recess is in contact with the contour C of the stud.

4. The tire of claim 1, wherein the contour G of at least one recess comprises at least two straight edges positioned facing each other.

5. The tire of claim 1, wherein the contour G of at least one recess comprises at least two curved edges positioned facing each other.

6. The tire of claim 1, wherein the tire has a preferred direction of rolling and at least one recess associated with the stud is positioned in such a way that at least part of its contour G comes into contact with the ground before the stud when the tire is rolling in its preferred direction of rolling.

7. The tire of claim 6, wherein at least one recess associated with the stud is positioned in such a way that the entire contour G of that recess comes into contact with the ground before the stud when the tire is rolling in its preferred direction of rolling.

8. The tire of claim 1, wherein the tire has a preferred direction of rolling and at least one recess associated with the stud is positioned in such a way that the entire contour G of that recess comes into contact with the ground after the stud when the tire is rolling in its preferred direction of rolling.

9. The tire of claim 1, wherein the tread of the tire comprises a plurality of tread blocks, each tread block comprising at least one stud and a plurality of recesses associated with the stud.

10. The tire of claim 9, wherein each tread block comprises at least two recesses.

11. The tire of claim 1, wherein at least one recess is extended radially inwards by a sipe.

12. The tire of claim 11, wherein the sipe is extended radially inwards by a cavity, the cavity being dimensioned such that when the tread is worn and the cavity opens onto the rolling surface, the cavity forms a recess in the rolling surface.

\* \* \* \* \*